US011750841B2

United States Patent
Hsiang

(10) Patent No.: US 11,750,841 B2
(45) Date of Patent: *Sep. 5, 2023

(54) METHODS AND APPARATUSES FOR CODING TRANSFORM BLOCKS

(71) Applicant: HFI INNOVATION INC., Zhubei (TW)

(72) Inventor: Shih-Ta Hsiang, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/973,600

(22) Filed: Oct. 26, 2022

(65) Prior Publication Data

US 2023/0037689 A1    Feb. 9, 2023

Related U.S. Application Data

(63) Continuation of application No. 16/727,049, filed on Dec. 26, 2019, now Pat. No. 11,523,136.

(60) Provisional application No. 62/865,982, filed on Jun. 25, 2019, provisional application No. 62/797,433, filed on Jan. 28, 2019.

(51) Int. Cl.
*H04N 19/60* (2014.01)
*H04N 19/13* (2014.01)
*H04N 19/176* (2014.01)

(52) U.S. Cl.
CPC ............. *H04N 19/60* (2014.11); *H04N 19/13* (2014.11); *H04N 19/176* (2014.11)

(58) Field of Classification Search
CPC ....... H04N 19/13; H04N 19/176; H04N 19/16
See application file for complete search history.

(56) References Cited

U.S. PATENT DOCUMENTS

| | | |
|---|---|---|
| 2015/0181237 A1 | 6/2015 | Tsukuba et al. |
| 2016/0277763 A1 | 9/2016 | Schwarz et al. |
| 2016/0353113 A1 | 12/2016 | Zhang |
| | (Continued) | |

FOREIGN PATENT DOCUMENTS

WO    WO 2012/122278 A1    9/2012

OTHER PUBLICATIONS

Office Action dated Apr. 28, 2021 in Taiwanese Patent No. 109102356.

*Primary Examiner* — Kathleen V Nguyen
(74) *Attorney, Agent, or Firm* — Oblon, McClelland, Maier & Neustadt, L.L.P.

(57) ABSTRACT

Video processing methods and apparatuses in a video encoding or decoding system for processing residual data of transform blocks. A current transform block in a video picture is divided into multiple sub-blocks, and each sub-block in the current transform block is entropy encoded or decoded using multiple sub-block coding passes. Each transform coefficient level in each sub-block is visited once according to a pre-defined scanning order in each sub-block coding pass. Two or more syntax elements associated with transform coefficient levels in the current transform block are aggregated and coded in one single sub-block coding pass. The video processing method is applied if the current transform block contains at least one non-zero transform coefficient level and the current transform block is coded in Transform Skip Mode (TSM) according to some embodiments.

15 Claims, 5 Drawing Sheets

(56) References Cited

U.S. PATENT DOCUMENTS

2020/0186814 A1    6/2020  Karczowicz
2021/0120231 A1*  4/2021  Yoo ........................ H04N 19/12
2021/0195251 A1    6/2021  Sarwer
2021/0211673 A1*  7/2021  Schwarz ................ H04N 19/91

* cited by examiner

METHODS AND APPARATUSES FOR CODING TRANSFORM BLOCKS

CROSS-REFERENCE TO RELATED APPLICATIONS

The present application is a continuation of U.S. patent application Ser. No. 16/727,049, filed on Dec. 26.2019, which claims priority to U.S. Provisional Patent Application, Ser. No. 62/797,433, filed on Jan. 28, 2019, entitled "Methods and apparatus for coding transform blocks", and U.S. Provisional Patent Application, Ser. No. 62/865,982, filed on Jun. 25, 2019, entitled "Methods and apparatus for coding transform blocks". Each of the prior applications is hereby incorporated by reference in its entirety.

FIELD OF THE INVENTION

The present invention relates to video processing methods and apparatuses to encode or decode video data in a video coding system. In particular, the present invention relates to entropy encoding or decoding transform coefficient levels in transform blocks.

BACKGROUND AND RELATED ART

The High-Efficiency Video Coding (HEVC) standard is the latest video coding standard developed by the Joint Collaborative Team on Video Coding (JCT-VC) group of video coding experts from ITU-T Study Group. The HEVC standard relies on a block-based coding structure which splits each video picture into multiple non-overlapped square Coding Tree Units (CTUs). Each individual CTU in a video picture or a slice is processed in a raster scanning order. In the HEVC main profile, the maximum and the minimum sizes of a CTU are specified by syntax elements signaled in the Sequence Parameter Set (SPS). A coded picture may be represented by a collection of slices, and each slice is composed of an integer number of CTUs. A Bi-predictive (B) slice may be decoded using intra prediction or inter prediction with at most two motion vectors and reference indices to predict sample values of each block in the B slice. A Predictive (P) slice is decoded using intra prediction or inter prediction with at most one motion vector and reference index to predict sample values of each block in the P slice. An Intra (I) slice is decoded using intra prediction only.

Each CTU is further recursively partitioned into one or more non-overlapped Coding Units (CUs) using a quadtree (QT) splitting structure in order to adapt various local characteristics. At each partition depth of the QT splitting structure, an N×N block is either a single leaf CU or split into four smaller blocks with equal size N/2×N/2. The CTU with the size M×M pixel samples is the root node of a quadtree coding tree, and the four M/2×M/2 blocks are the child quadtree nodes split from the root node. Each of the four M/2×M/2 blocks may become a parent node partitioned by another QT splitting to result in four child nodes with further reduced size by half in each spatial dimension. If a coding tree node is not further split, it is called a leaf CU. The leaf CU size is restricted to be larger than or equal to a minimum allowed CU size, which is also specified in the SPS. An example of a recursive quadtree splitting structure is illustrated in FIG. 1, where the solid lines indicate CU boundaries in the CTU 10.

Once the CTUs are partitioned into leaf CUs, each leaf CU is subject to further split into one or more Prediction Units (PUs) according to a PU splitting type for prediction according to the HEVC standard. Unlike the recursive quadtree splitting for CUs, each leaf CU may only be split once to form one or more PUs. The PU and associated CU syntax work as a basic representative block for sharing prediction information as the same prediction process is applied to all pixel samples in the PU. The prediction information is conveyed to the decoder on a PU basis. After obtaining residual data generated by the prediction process based on the PU splitting type, the residual data belonging to a leaf CU is partitioned into one or more Transform Units (TUs) according to a Residual QuadTree (RQT) splitting structure for transforming the residual data into transform coefficients for compact data representation. The dashed lines in FIG. 1 indicate TU boundaries in the CTU 10. The TU is a basic representative block for applying transform and quantization on the residual data or transform coefficients. For each TU, a transform matrix having the same size as the TU is applied to the residual data to generate transform coefficients, and these transform coefficients are quantized and conveyed to the decoder on a TU basis. An integer transform and quantization are applied to a Transform Block (TB) and transform coefficient levels of the TB together with other side information are entropy coded in the video bitstream.

The terms Coding Tree Block (CTB), Coding block (CB), Prediction Block (PB), and TB are defined to specify two-dimensional (2-D) sample array of one color component associated with the CTU, CU, PU, and TU respectively. For example, a CTU consists of one luminance (luma) CTB, two chrominance (chroma) CTBs, and its associated syntax elements. A similar relationship is valid for CU, PU, and TU. For example, a TU is composed of a TB of luma samples of size 8×8, 16×16, or 32×32 or four TBs of luma samples of size 4×4, and two corresponding TBs of chroma samples in a picture coded with 4:2:0 color format. In the HEVC system, the same quadtree splitting structure is generally applied to both luma and chroma components unless a minimum size for the chroma block is reached.

Joint Video Expert Team (JVET) of ITU-T SG16 WP3 and ISO/IEC JTC1/SC29/WG11 are currently in the process of establishing the next-generation video coding standard Versatile Video Coding (VVC). Some promising new coding tools have been adopted into VVC Working Draft(WD) 2. In VVC WD2, each CTU is partitioned into one or multiple smaller size CUs by a quadtree with nested multi-type tree using binary and ternary tree splitting. The resulting CUs can be in square and rectangular shapes. In the HEVC standard and VVC WD3, a Coded Block Flag (CBF) is utilized to signal in a video bitstream if there is any non-zero transform coefficient in a transform block. When this CBF is equal to 0, an associated transform block is not further coded as all coefficients in the transform block are inferred to be equal to 0. When the CBF is 1, an associated transform block contains at least one non-zero transform coefficient.

A non-zero transform block is further divided into non-overlapping sub-blocks. A syntax element coded_sub_block_flag may be signaled to indicate whether a current sub-block contains any non-zero coefficient. If this syntax element coded_sub_block_flag is equal to 0, an associated transform sub-block is not further coded as all coefficients in the transform sub-block are inferred to be equal to 0, otherwise the associated transform sub-block contains at least one non-zero transform coefficient. The values of the transform coefficient levels in an associated transform sub-block are entropy coded using multiple sub-block coding passes. In each coding pass, individual transform coefficients are visited once according to a pre-defined scanning order.

In the HEVC standard, a syntax element sig_coeff_flag is signaled in a first sub-block coding pass to indicate whether an absolute value of a current transform coefficient level is greater than 0. A syntax element coeff_abs_level_greater1_flag is further signaled in a second sub-block coding pass for the current transform coefficient level when sig_coeff_flag is equal to 1 to indicate whether the absolute value of the current transform coefficient level is greater than 1. A syntax element coeff_abs_level_greater2_flag is further signaled in a third sub-block coding pass for the current transform coefficient level when coeff_abs_level_greaterI_flag is equal to 1 to indicate whether the absolute value of the current transform coefficient level is greater than 2. The sign information and remaining level values are further signaled by syntax elements coeff_sign_flag and coeff_abs_level_remaining in fourth and fifth sub-block coding passes respectively.

In VVC WD4, transform coefficients may be quantized by dependent scalar quantization. The selection of one of the two quantizers is determined by a state machine with four states. A state of a current transform coefficient is determined by a state and parity of an absolute level value for a preceding transform coefficient in the scanning order. Each transform block is partitioned into non-overlapped sub-blocks. Transform coefficient levels in each sub-block are entropy coded using multiple sub-block coding passes. Syntax elements sig_coeff_flag, abs_level_gt1_flag, par_level_flag, and abs_level_gt3_flag are signaled in a first sub-block coding pass. The syntax element sign_coeff_flag indicates whether an absolute value of a current transform coefficient level is greater than 0. The syntax elements abs_level_gt1_flag and abs_level_gt3_flag indicate whether the absolute value of the current transform coefficient level is greater than 1 and 3 respectively. The syntax element par_level_flag indicates the parity bit of the absolute value of the current transform coefficient level. A partially reconstructed absolute value of the current transform coefficient level from the first sub-block coding pass is therefore derived by Equation (1).

$$\text{AbsLevelPass1} = sig\_\text{coeff\_flag} + par\_\text{level\_flag} + \text{abs\_level\_}gt1\_\text{flag} + 2*\text{abs\_level\_}gt3\_\text{flag} \quad \text{Equation (1)}$$

Context selection for entropy coding the syntax element sign_coff_flag is dependent on the state for a current transform coefficient level. A syntax element par_level_flag is thus signaled in the first sub-block coding pass for deriving the state for a next transform coefficient level. Syntax elements abs_remainder and coeff_sign_flag are further signaled in the following sub-block coding passes to indicate remaining coefficient level values and signs, respectively. A full reconstructed absolute value of the transform coefficient level is derived by Equation (2).

$$\text{AbsLevel} = \text{AbsLevelPass1} + 2*\text{abs\_remainder} \quad \text{Equation (2)}$$

The transform coefficient level is derived by Equation (3).

$$\text{TransCoeffLevel} = (2*\text{AbsLevel} - (\text{QState} > 1?1:0))*(1 - 2*\text{coeff\_sign\_flag}), \quad \text{Equation (3)}$$

where Qstate indicates the state for the current transform coefficient level.

For achieving high compression efficiency, a Context-based Adaptive Binary Arithmetic Coding (CABAC) mode, also known as a regular mode, is employed for entropy coding values of the syntax elements in the HEVC standard and VVC WD3. FIG. 2 shows a block diagram of a CABAC engine performing a CABAC process. As a Binary arithmetic coder 200 in the CABAC engine can only encode binary symbol values, the CABAC process first needs to convert the value of a non-binary valued syntax element into a binary string using a Binarizer 210, and this process is commonly referred to as binarization. If an input syntax element is a binary valued syntax element, the input syntax element bypasses binarization performed in the Binarizer 210. The binary string or binary valued syntax element is coded by a regular mode or a bypass mode. During the coding process, probability models are gradually built up from the coded symbols for different contexts in a Context Modeler 212. The selection of the modeling context for coding a next binary symbol can be determined by the coded information. The Context Modeler 212 passes one or more bin values and context models to a Regular Coding Engine 214 to generate one or more coded bins. Symbols can be coded without the context modeling stage and assume an equal probability distribution, which is commonly referred to as the bypass mode, for improving bitstream parsing throughput rate. A Bypass Coding Engine 216 generates coded bins for the syntax element if it is processed by the bypass mode.

In the HEVC standard, the values of the syntax elements coded_sub_block_flag, sig_coeff_flag, coff_abs_level_greater1_flag, and coeff_abs_level_greater2_flag in a transform sub-block are coded in the regular mode. The values of the syntax elements coeff_sign_flag and coeff_abs_level_remaining in a transform sub-block are coded in the bypass mode. In order to limit the total number of the regular bins for entropy coding transform coefficient levels in a sub-block under the worst-case scenario, each sub-block only allows to code up to eight coeff_abs_level_greater1_flag values and one coeff_abs_level_greater2_flag value. In this way, the maximum number of the regular bins in each sub-block can be limited to 25.

BRIEF SUMMARY OF THE INVENTION

Methods and apparatuses of video processing in a video coding system for encoding or decoding video data in video pictures comprise receiving input data associated with a current transform block in a current video picture, dividing the current transform block into sub-blocks, and entropy encoding or decoding each sub-block in the current transform block using multiple sub-block coding passes. Each transform coefficient level in each sub-block is visited once according to a pre-defined scanning order in each sub-block coding pass. An example of the pre-defined scanning order is a forward scanning order when the current transform block is coded in Transform Skip Mode (TSM). In some embodiments, the methods and apparatuses further comprise determining if the current transform block has at least one non-zero coefficient level, and the current transform block is divided into sub-blocks and each sub-block in the current transform block is entropy encoded or decoded using multiple sub-block coding passes if the current transform block has at least one non-zero coefficient level. More than one syntax element is entropy encoded or decoded in one single sub-block coding pass. In some embodiments of the present invention, at least syntax elements abs_level_gt5_flag, abs_level_gt7_flag, and abs_level_gt9_flag for transform coefficient levels in each sub-block are entropy encoded or decoded in one single sub-block coding pass. The syntax elements abs_level_gt5_flag, abs_level_gt7_flag, and abs_level_gt9_flag for a current transform coefficient level indicate whether an absolute value of the current transform coefficient level is greater than 5, 7, and 9 respectively. In one embodiment, syntax elements sig_coeff_flag, coeff_sign_flag, abs_level_gt1_flag, and par_level_flag for transform coefficient levels in each sub-block are coded or decoded in a first sub-block coding pass, and the syntax elements abs_level_gt3_flag, abs_level_gt5_flag, abs_level_gt7_flag, and abs_level_gt9_flag are encoded or decoded in a second sub-block coding pass. The syntax elements sig_coeff_flag, abs_level_gt1_flag, and abs_level_gt3_flag for the current transform coefficient level indicate whether the absolute value of the current transform coefficient level is greater than 0, 1, and 3 respectively, the syntax element coeff_sign_flag for the current transform coefficient level indicates a sign of the current transform coefficient level, and the syntax element par_level_flag for the current transform coefficient level indicates a parity bit of the absolute value of the current transform coefficient level. In this embodiment, syntax elements abs_remainder for transform coefficient levels in each sub-block are encoded or decoded in a third sub-block coding pass, indicating remaining coefficient levels of the transform coefficient levels. The absolute value of each transform coefficient level is reconstructed by sig_coeff_flag+par_level_flag+abs_leveL_gt1_flag+2*abs_level_gt3_flag+2*abs_level_gt5_flag+2*abs_level_gt9_flag_+2*abs_remainder.

In cases when the current transform block does not have any non-zero transform coefficient level, the video encoding or decoding system skips entropy encoding or decoding the transform coefficient levels in the current transform block as all the transform coefficient levels are zero. In some embodiments, the current transform block is entropy encoded or decoded using multiple sub-block coding pass when the current transform block is coded in Transform Skip Mode (TSM), where the current transform block is entropy encoded or entropy decoded without transforming from a sample domain into a frequency domain. A transform block level flag is signaled or parsed to indicate the current transform block is to be encoded or decoded in TSM.

The video encoding system checks all transform coefficient levels in the current transform block and signals a Coded Block Flag (CBF) for the current transform block indicating whether all the transform coefficient levels are equal to zero. The video decoding system determines if the current transform block has at least one non-zero transform coefficient level by parsing this CBF for the current transform block from a video bitstream containing the current video picture.

In one embodiment, the video processing method further comprises determining if each sub-block in the current transform block is to be decoded according to a syntax element code_sub_block_flag signaled for each sub-block, this syntax element indicates whether a current sub-block contains any non-zero coefficient, and the video processing method skips decoding the current sub-block if this syntax element indicates the current sub-block does not contain any non-zero coefficient.

In one embodiment of the present invention, all syntax elements associated with the transform coefficient levels in each sub-block entropy coded in a Context-based Adaptive Binary Arithmetic Coding (CABAC) mode are encoded or decoded in a first sub-block coding pass while remaining syntax elements coded in a bypass mode are encoded or decoded in one or more following sub-block coding passes.

In one embodiment, syntax elements abs_level_gt3_flag for transform coefficient levels in each sub-block are encoded or decoded in the same sub-block coding pass as the syntax elements abs_level_gt5_flag, abs_level_gt7_flag, and abs_level_gt9_flag. In another embodiment, syntax elements abs_level_gt1_flag and abs_level_gt3_flag for transform coefficient levels in each sub-block are encoded or decoded in the same sub-block coding pass as the syntax elements abs_level_gt5_flag, abs_level_gt7_flag, and abs_level_gt9_flag. In another embodiment, syntax elements sig_coeff_flag, abs_level_gt1_flag, and abs_level_gt3 flag for transform coefficient levels in each sub-block are encoded or decoded in the same sub-block coding pass as the syntax elements abs_level_gt5_flag, abs_level_gt7_flag, and abs_level_gt9 flag. In yet another embodiment, syntax elements sig_coeff_flag, coeff_sign_flag, abs_level_gt1_flag, and abs_level_gt3_flag for transform coefficient levels in each sub-block are also encoded or decoded in the same sub-block coding pass as the syntax elements abs_level_gt5_flag, abs_level_gt7_flag, and abs_level_gt9 flag.

In some embodiments, one or more syntax elements for transform coefficient levels in a current sub-block are moved to a later sub-block coding pass if a number of context-coded bins is under a specified constraint in the current sub-block.

In an embodiment, the syntax elements abs_levet_gt5_flag, abs_level_t7_flag, and abs_level_gt9_flag are encoded or decoded using a CABAC mode and syntax element coeff_sign_flag for transform coefficient levels in each sub-block are encoded or decoded using a bypass mode.

In another embodiment, syntax elements sig_coeff_flag, abs_level_gt1_flag, par_level_flag, and abs_level_gt3_flag for transform coefficient levels in each sub-block are encoded or decoded in a first sub-block coding pass, and the syntax elements abs_level_gt5_flag, abs_level_gt7_flag, abs_level_gt9_flag, and coeff_sign_flag are encoded or decoded in a second sub-block coding pass.

Aspects of the disclosure further provide an apparatus implemented in a video encoding system or a video decoding system, and the apparatus receives input data of a current transform block, divides the current transform block into sub-blocks and entropy encodes or decodes each sub-block in the current transform block using multiple sub-block coding passes. Each transform coefficient level in each sub-block is visited once according to a pre-defined scanning order in each sub-block coding pass. Syntax elements abs_level_gt5_flag, abs_level_gt7_flag, and abs_level_gt9_flag for transform coefficient levels in each sub-block are entropy encoded or decoded in one single sub-block coding pass. An embodiment of the apparatus is implemented in an entropy encoder or entropy decoder of the video encoding or decoding system.

Aspects of the disclosure further provide a non-transitory computer readable medium storing program instructions for causing a processing circuit of an apparatus to perform video coding process to entropy encode or decode transform coefficient levels in a current transform block using multiple sub-block coding passes. Two or more syntax elements associated with the transform coefficient levels are aggregated to be processed in one single sub-block coding passes. Other aspects and features of the invention will become apparent to those with ordinary skill in the art upon review of the following descriptions of specific embodiments.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF THE INVENTION

Figure 1:
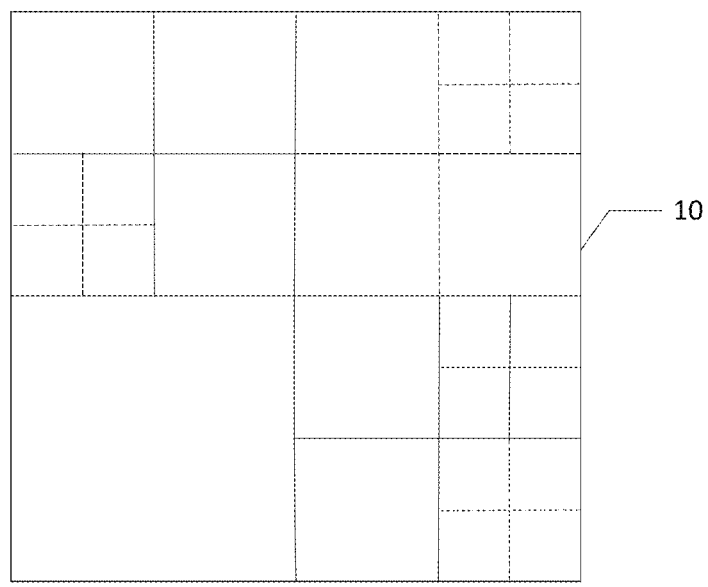
FIG. 1 illustrates an exemplary coding tree for splitting a Coding Tree Unit (CTU) into Coding Units (CUs) and splitting each CU into one or more Transform Units (TUs) according to a quadtree splitting structure.
Figure 2:
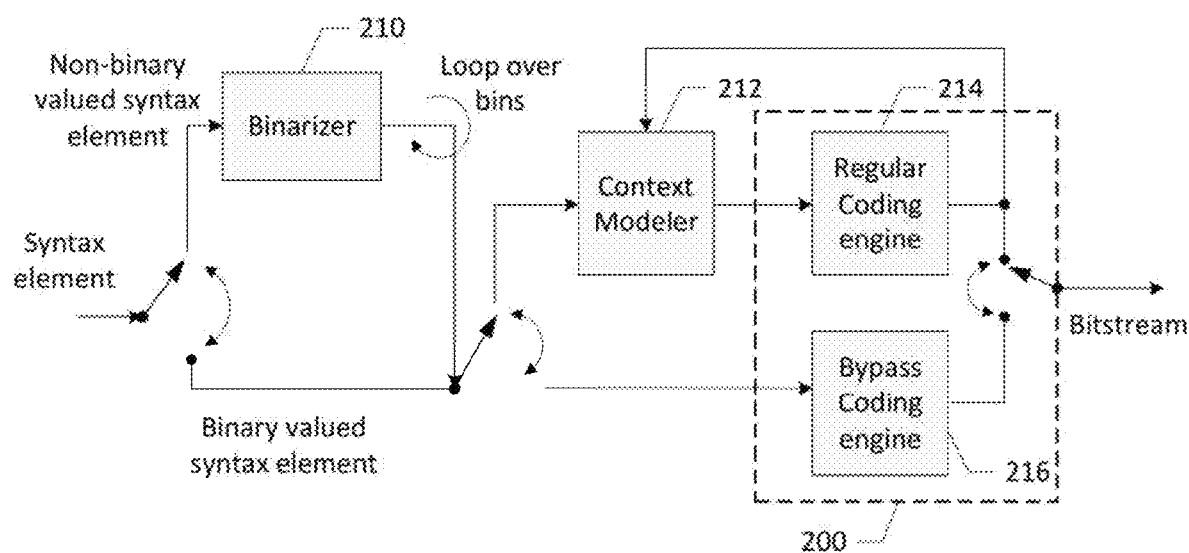
FIG. 2 illustrates a block diagram of a Context-based Adaptive Binary Arithmetic Coding (CABAC) process.

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiments. Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

Concept of Transform Skip Mode Transform Skip Mode (TSM) is a coding tool that processes a quantized residual signal by entropy coding without going through the transform operation. A residual signal of a block coded in TSM is encoded directly in a sample domain instead of transforming into a frequency domain. TSM is found to be particularly beneficial for screen content coding especially for regions with sharp edges and simple colors. In VVC working draft, TSM can be controlled by high level syntax, for example, an enable flag may be used to select on or off of TSM, and a syntax element may be used to signal a size constraint for applying TSM. For example, TSM is allowed to be applied to a transform block with a width or height larger than or equal to 32 luma samples. A transform block level flag is signaled to indicate whether TSM is applied to a current transform block when TSM is enabled. Both dependent quantization and sign data hiding are disabled when TSM is enabled for a transform block. Residual blocks coded in TSM are processed by a separate parsing process.

Multiple Sub-block Coding Passes for Entropy Coding Transform Coefficient Levels Various embodiments of a video encoding or decoding system process transform coefficient levels by dividing the non-zero transform block into non-overlapping sub-blocks. In some embodiments, only transform blocks with at least one non-zero transform coefficient are divided into sub-blocks for entropy coding, and in some embodiments, only transform blocks coded in TSM are divided into sub-blocks for entropy coding. In a preferred embodiment, the transform blocks with one or more non-zero transform coefficients coded in TSM are divided into sub-blocks for entropy coding. A CBF is signaled to indicate whether a current transform block contains any non-zero coefficient, similarly, a syntax element coded_sub_block_flag may be signaled in a video bitstream to indicate whether a current sub-block contains any non-zero coefficients. The current sub-block is not further coded if this syntax element coded_sub_block_flag indicates all coefficients in the current sub-block are inferred to be equal to 0. The values of transform coefficient levels in each transform sub-block are entropy coded using multiple sub-block coding passes. In each sub-block coding pass, individual transform coefficient level is visited once according to a pre-defined scanning order. For example, the pre-defined scanning order is forward zigzag scanning order when the current transform block is coded in TSM. In some embodiment, syntax elements sig_coeff_flag, coeff_sign_flag, abs_level_gt1_flag, and par_level_flag, abs_level_gt3_flag, abs_level_gt5_flag, abs_level_gt7_flag, abs_level_gt9_flag, abs_remainder are entropy coded in the multiple sub-block coding passes. The syntax elements sig_coeff_flag, abs_level_gt1_flag, abs_level_gt3_flag, abs_level_gt5_flag, abs_level_gt7_flag, and abs_level_gt9_flag indicate whether an absolute value of a corresponding transform coefficient level is greater than 0, 1, 3, 5, 7, and 9 respectively. The syntax element coeff_sign_flag indicates the sign of a corresponding transform coefficient level, and the syntax element par_level_flag indicates the parity bit of the absolute value of a corresponding transform coefficient level. A context modeling for the syntax element sig_coeff_flag is conditioned on sig_coeff_flag values of two neighbors. A context modeling for the syntax element abs_level_gt1_flag and par_level_flag employs single context respectively. The syntax elements abs_level_gtX_flag [n][j], where j=0..4, represent the syntax element abs_level_gt1_flag when j is equal to 0, represent the syntax element abs_level_gt3_flag when j is equal to 1, represent the syntax element abs_level_gt5_flag when j is equal to 2, represent the syntax element abs_level_gt7_flag when j is equal to 3, or represent the syntax element abs_level_gt9_flag when j is equal to 4. The syntax elements abs_leveL_gtX_flag [n][j] specify whether the absolute value of each transform coefficient level at a scanning position n is greater than (j<<1)+1.

A reconstructed absolute value of a current transform coefficient level in a sub-block according to embodiments of the present invention is derived by Equation (4).

$$\text{AbsLevel} = \text{sig\_coeff\_flag} + \text{par\_level\_flag} + \text{abs\_level\_gt1\_flag} + 2*\text{abs\_level\_gt3\_flag} + 2*\text{abs\_level\_gt5\_flag} + 2*\text{abs\_level\_gt7\_flag} + 2*\text{abs\_level\_gt9\_flag} + 2*\text{abs\_remainder} \quad \text{Equation (4)}$$

Context selection for entropy coding the syntax element sign_coff_flag may be dependent on the state for a current transform coefficient level. A syntax element par_level_flag can be signaled in the first sub-block coding pass for deriving the state for a next transform coefficient level. Syntax elements abs_remainder and coeff_sign_flag indicate a remaining coefficient level value and sign respectively.

The current transform coefficient level according to embodiments of the present invention is derived by Equation (5).

$$TransCoeffLevel = AbsLevel*(1-2*coeff\_sign\_flag) \quad \text{Equation (5)}$$

Embodiments of the present invention reveals modified methods related to entropy coding values of transform coefficient levels in a transform block. A video coding system divides each transform block into one or multiple non-overlapped sub-blocks, and encodes or decodes each sub-block one by one according to a specified scanning order. For example, the specified scanning order is a forward scanning order or a backward scanning order. In each sub-block, values of the transform coefficient levels are entropy encoded or decoded by multiple sub-block coding passes. In each sub-block coding pass for encoding or decoding a current sub-block, one or more syntax elements, if not inferred, are encoded or decoded for each of the transform coefficient levels in the current sub-block according to the specified scanning order. A video coding system may further comprise employing a dependent scalar quantization scheme for quantizing or de-quantizing the values of the transform coefficient levels.

Combine Two or More Sub-block Coding Passes In some embodiments for entropy coding a transform block with one or more non-zero transform coefficients, a video encoding or decoding system combines two or more sub-block coding passes into one sub-block coding pass in order to simplify the multi-pass processing. In one embodiment, a video encoding or decoding system combines the sub-block coding passes by entropy encoding or decoding the syntax elements sig_coeff_flag, coeff_sign_flag, abs_level_gt1_flag, and par_level_flag in a first sub-block coding pass, entropy encoding or decoding the syntax elements abs_level_gt3_flag, abs_level_gt5_flag, abs_level_gt7_flag, and abs_level_gt9_flag in a second sub-block coding pass, and entropy encoding or decoding the syntax element abs_remainder in a third sub-block coding pass. In another embodiment, a first sub-block coding pass encodes or decodes the syntax elements sig_coeff_flag, abs_level_gt1_flag, par_level_flag, abs_level_gt3_flag, a second sub-block coding pass encodes the syntax elements abs_level_gt5_flag, abs_level_gt7_flag, and abs_level_gt9_flag, and one or two following sub-block coding passes encode or decode the syntax elements coeff_sign_flag and abs_remainder.

In some embodiments, a single sub-block coding pass is employed for encoding or decoding the syntax elements abs_level_gt3_flag, abs_level_gt5_flag, abs_level_gt7_flag, and abs_level_gt9_flag associated with each transform coefficient level in a current sub-block. By aggregating these syntax elements in one sub-block coding pass, the complexity of performing entropy coding process for each sub-block may be reduced. In another embodiment, a single sub-block coding pass is employed for encoding or decoding the syntax elements abs_level_gt1_flag, abs_level_gt3_flag, abs_level_gt5_flag, abs_level_gt7_flag, and abs_level_gt9_flag associated with each transform coefficient level in a current sub-block. In yet another embodiment, a single sub-block coding pass is employed for encoding or decoding the syntax elements sig_coeff_flag, abs_level_gt1_flag, abs_level_gt3_flag, abs_level_gt5_flag, abs_level_gt7_flag, and abs_level_gt9 flag associated with each transform coefficient level in a current sub-block. In yet another embodiment of combining multiple sub-block coding passes, a single sub-block coding pass is employed for encoding or decoding the syntax elements sig_coeff_flag, coeff_sign_flag, abs_level_gt1_flag, abs_level_gt3_flag, abs_level_gt5_flag, abs_level_gt7_flag, and abs_level_gt9 flag associated with each transform coefficient level in a current sub-block.

In one embodiment for entropy coding a transform block coded in TSM, a syntax element abs_level_gt3_flag is coded after a syntax element par_level_flag in the first sub-block coding pass for a current transform, instead of coding in the second sub-block coding pass. The first sub-block coding pass encodes or decodes syntax elements sig_coeff_flag, abs_level_gt1_flag, par_level_flag, and abs_level_gt3_flag. One or multiple following sub-block coding passes are employed for encoding or decoding the sign and remaining level value of each transform coefficient level in the current transform block. The first sub-block coding pass may further comprise encoding or decoding the syntax element coeff_sign_flag after encoding or decoding the syntax element sig_coeff_flag instead of encoding or decoding the signs in a following sub-block coding pass.

Adaptively Move Syntax Elements to Later Sub-block Coding Pass There may be a budget on context-coded bins restricting a total number of context-coded bins used to code each transform block, for example, if up to 2 context-coded bins are allowed to be used to code each sample in the transform block, the budget is equal to two times the transform block size. According to another aspect of the present invention, when a number of context-coded bins is under a specified constraint in a current sub-block or a current transform block, embodiments of a video encoding or decoding system may move encoding or decoding the syntax elements associated with expected lower compression efficiency to a later sub-block coding pass. In this way, the budget on context-coded bins can be allocated to encode or decode syntax elements associated with better compression efficiency. For example, a video encoding or decoding system may remove coding the syntax element par_level_flag from the first sub-block coding pass and add a separate sub-block coding pass dedicated for coding this syntax element par_level_flag after signaling all syntax elements abs_level_gtX_flag[n][j], where j=1..4.

Exemplary Embodiments Demonstrated by Pseudo Codes In some embodiments, the modified process for encoding or decoding a residual block with one or more non-zero transform coefficient levels is illustrated by pseudo codes as follows:

Loop over all sub-blocks in a current transform block according to a scanning order Loop over each coefficients at position n in a sub-block according to a scanning order If (coded_subblock_flag [n])

sig_coeff_flag [n]

If (sig_coeff_flag [n])

coeff_sign_flag [n]

abs_level_gtX_flag [n][0]

Loop over each coefficients at position n in a sub-block according to a scanning order If (abs_level_gtX_flag [n][0]), loop over j=1..4 abs_level_gtX_flag [n][j]

If (abs_level_gtX_flag [n][j]==0)

break

Loop over each coefficients at position n in a sub-block according to a scanning order If (abs_level_gtX_flag [n][0])

par_level_flag [n]

Loop over each coefficients at position n in a sub-block according to a scanning order
    If (abs_level_gtX_flag [n][4])
        abs_remainder [n]
where bold words in the above pseudo code indicate signaling the values of the syntax elements. In this embodiment, a first sub-block coding pass processes syntax elements sig_coeff_flag for transform coefficient levels in a current sub-block if a corresponding syntax element coded_subblock_flag indicates there is at least one non-zero transform coefficient level in the current sub-block, and processes syntax elements coeff_sign_flag and abs_level_gt1_flag for each transform coefficient level in the current sub-block if the corresponding syntax element sig_coeff_flag of that transform coefficient level indicates the absolute value is greater than 0. A second sub-block coding pass processes syntax elements abs_level_gt3_flag, abs_level_gt5_flag, abs_level_gt7_flag, and abs_level_gt9_flag for each transform coefficient level in the current sub-block if the corresponding syntax element abs_level_gt1_flag of that transform coefficient level indicates the absolute value is greater than 1. A third sub-block coding pass processes a syntax element par_level_flag for each transform coefficient level in the current sub-block if the corresponding syntax element abs_level_gt1_flag indicates the absolute value of the transform coefficient level is greater than 1. A fourth sub-block coding pass processes a syntax element abs_remainder for each transform coefficient level in the current sub-block if the corresponding syntax element abs_level_gt9 flag indicates the absolute value of the transform coefficient level is greater than 9.

In some other embodiments, the modified process for encoding or decoding a residual block containing one or more transform coefficient levels is illustrated by pseudo codes as follows:
Loop over all sub-blocks in a current transform block according to a scanning order
  Loop over each coefficients at position n in a sub-block according to a scanning order
    If (coded_subblock_flag [n])
      sig_coeff_flag [n]
    If (sig_coeff_flag [n])
      coeff_sign_flag [n]
  Loop over each coefficients at position n in a sub-block according to a scanning order
    If (abs_level_gtX_flag [n][0]), loop over j=0..4
      abs_level_gtX_flag [n][j]
      If (abs_level_gtX_flag [n][j]=0)
        break
  Loop over each coefficients at position n in a sub-block according to a scanning order
    If (abs_level_gtX_flag [n][0])
      par_level_flag [n]
  Loop over each coefficients at position n in a sub-block according to a scanning order
    If (abs_level_gtX_flag [n][4])
      abs_remainder [n]
where bold words in the above pseudo code indicate signaling the values of the syntax elements. This embodiment is very similar to the previous embodiment except the syntax element abs_level_gt1_flag is processed in the second sub-block coding pass instead of the first sub-block coding pass. The residual block processed by the multiple sub-block passes in the above embodiments is coded in TSM, and the scanning order is a forward scanning order.

Coefficient Sign Flag Signaling In one embodiment for entropy coding a transform block coded in TSM, a video encoding or decoding system may entropy encode or decode the syntax element coeff_sign_flag using a bypass mode. A video encoding or decoding system may signal the syntax element coeff_sign_flag after signaling the syntax element abs_remainder in the final sub-block coding pass. Alternatively, a video encoding or decoding system may signal the syntax element coeff_sign_flag in a separate sub-block coding pass. In one embodiment, the syntax element coeff_sign_flag is separately signaled in the final sub-block coding pass. In another embodiment for entropy coding a transform block in TSM, a video encoding or decoding system may entropy encode or decode the syntax element coeff_sign_flag using a regular mode. The syntax element coeff_sign_flag is signaled after other context-coded syntax elements related to coding a current sub-block. In one example, a video encoding or decoding system encodes or decodes the syntax element sig_coeff_flag, abs_level_gt1_flag, par_level_flag, and abs_level_gt3_flag in the first sub-block coding pass and encodes or decodes the syntax elements abs_level_gt5_flag, abs_level_gt7_flag, abs_level_gt9_flag, and coeff_sign_flag in the second sub-block coding pass. In another example, a video encoding or decoding system encodes or decodes the syntax elements sig_coeff_flag, abs_level_gt1_flag, par_level_flag, and abs_level_gt3_flag in the first sub-block coding pass, encodes or decodes the syntax elements abs_level_gt5_flag and abs_level_gt7_flag in the second sub-block coding pass, and encodes or decodes the syntax elements abs_level_gt9_flag and coeff_sign_flag in the third sub-block coding pass.

Context Coding in First Sub-block Coding Pass In one embodiment for entropy coding a transform block coded in TSM, the first sub-block coding pass comprises entropy coding one or multiple syntax elements using context-based adaptive binary arithmetic coding, wherein the selection of at least one context variable for a current transform coefficient level is dependent on the state of dependent scalar quantization associated with a current transform coefficient level. In this embodiment, all syntax elements entropy coded in a regular mode (i.e. Context-based Adaptive Binary Arithmetic Coding mode) are encoded or decoded in the first sub-bock coding pass. In one example, the first sub-block coding pass comprises encoding or decoding syntax elements sig_coeff_flag, abs_level_gt1_flag, par_level_flag, and abs_level_gt3_flag.

In another embodiment for entropy coding a transform block in TSM generated by dependent scalar quantization, a video encoding or decoding system entropy encodes or decodes a plurality of syntax elements associated with a current sub-block using context-based adaptive binary arithmetic coding, wherein context modeling is independent from the state of dependent scalar quantization associated with a current coefficient level for entropy coding all syntax elements and no single syntax element is dedicated to signaling the parity of the level value of a current coefficient level. In one example, a video encoding or decoding system encodes or decodes the syntax elements sig_coeff_flag, coeff_abs_level_gt1_flag, and coeff_abs_level_gt2_flag in the first sub-block coding pass and encodes or decodes the syntax element abs_remaining in the second sub-block coding pass, and encodes or decodes the syntax element coeff_sign_flag in the final sub-block coding pass. In another example, a video encoding or decoding system encodes or decodes the syntax elements sig_coeff_flag, coeff_sign_flag, coeff_abs_level_gt1_flag, and coeff_abs_level_gt2_flag in the first sub-block coding pass and encodes or decodes the syntax element abs_remaining in the second sub-block coding pass.

In one embodiment, a video encoding or decoding system uses Differential Pulse Code Modulation (DPCM) for coding a residual signal in TSM, using dependent scalar quantization for generating quantized or de-quantized coefficient levels, and using a forward scanning order for encoding or decoding individual coefficient levels.

Figure 3:
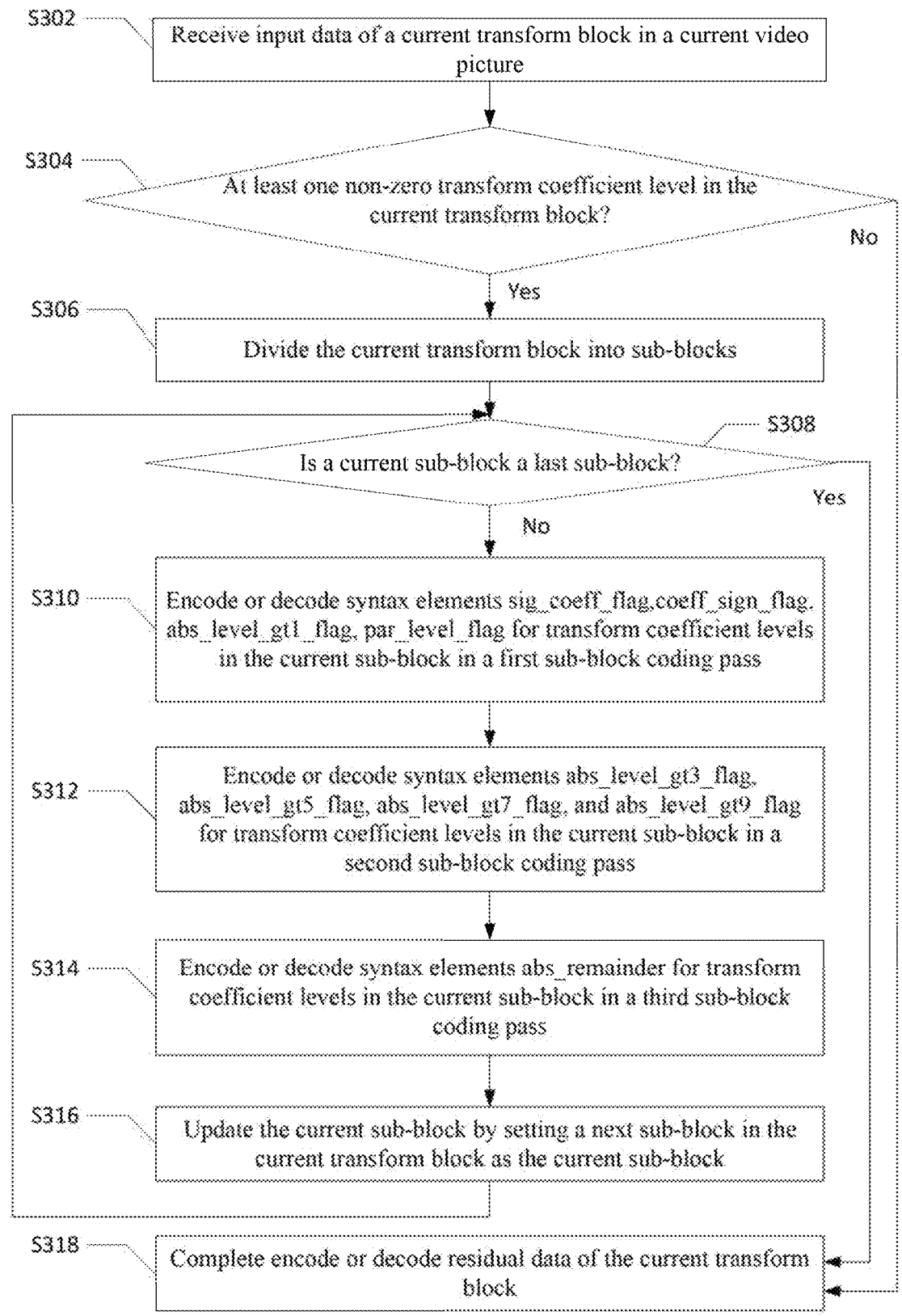
FIG. 3 is a flowchart illustrating an embodiment of the video processing method for encoding or decoding a current transform block in a current video picture by multiple sub-block coding passes.

Exemplary Flow Charts FIG. 3 is a flowchart illustrating an exemplary embodiment of the video processing method implemented in a video encoding or decoding system. The video encoding or decoding system in this exemplary embodiment processes residual data in a current video picture, where the residual data in the current video picture is partitioned into multiple Transform Units (TUs), and each TU is composed of luma and chroma Transform Blocks (TBs). The exemplary embodiment of the video processing method first receives input data associated with a current transform block in the current video picture in step S302, and determines if the current transform block has at least one non-zero transform coefficient levels in step S304. For example, the video decoding system determines whether the current transform block has at least one non-zero transform coefficient levels according to CBF of the current transform block. If there is at least one non-zero transform coefficient levels in the current transform block, the current transform block is divided into sub-blocks for entropy encoding or decoding in step S306. In a specific embodiment, the current transform block is coded in TSM which bypasses transforming from the sample domain to the frequency domain during encoding or bypasses inverse transforming from the frequency domain back to the sample domain during decoding. Step S308 checks if a current sub-block is a last sub-block in the current transform block, and if it is not the last sub-block, transform coefficient levels in the current sub-block is encoded or decoded by multiple sub-block coding passes illustrated in steps S310 to S316. Each transform coefficient level in the current sub-block is visited once according to a pre-defined scanning order in each sub-block coding pass. In this exemplary embodiment, a first sub-block coding pass encodes or decodes syntax elements sig_coeff_flag, coeff_sign_flag, abs_level_gt1_flag, and par_level_flag for transform coefficient levels in the current sub-block in step S310. A second sub-block coding pass encodes or decodes syntax elements abs_level_gt3_flag, abs_level_gt5_flag, abs_level_gt7_flag, and abs_level_gt9 flag for transform coefficient levels in the current sub-block in step S312. A third sub-block coding pass encodes or decodes syntax elements abs_remainder for transform coefficient levels in the current sub-block in step S314. In some other embodiments, there are two, four, or five sub-block coding passes for encoding or decoding these syntax elements. An example of employing two sub-block coding passes, all syntax elements coded in CABAC regular mode are encoded or decoded in the first sub-block coding pass, and all other syntax elements coded in bypass mode are encoded or decoded in the second sub-block coding pass. In these embodiments, syntax elements originally processed in different sub-block coding passes are aggregated and processed in one sub-block coding pass to reduce the total number of data access during entropy encoding or decoding. In step S316 as shown in FIG. 3, a next sub-block in the current transform block is set to be the current sub-block and the flowchart proceeds to step S308. When all the sub-block in the current transform block are encoded or decoded by multiple sub-block coding passes, encoding or decoding of the residual data of the current transform block is complete in step S318.

Figure 4:
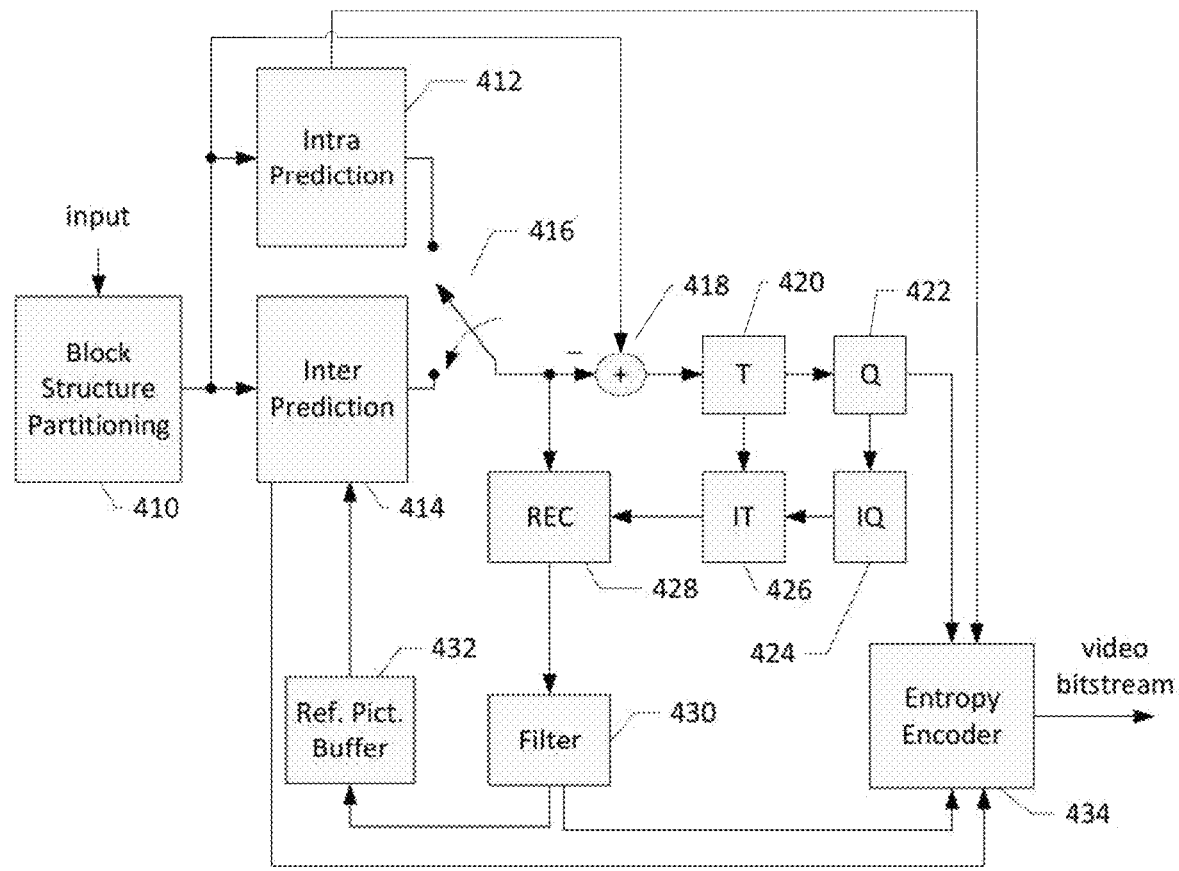
FIG. 4 illustrates an exemplary system block diagram for a video encoding system incorporating the video processing method according to embodiments of the present invention.

Exemplary System Block Diagram Embodiments of the video processing method are implemented in video encoders, video decoders, or both the video encoders and decoders. For example, the video processing method is implemented in an entropy coding module in the video encoder or in an entropy coding module in the video decoder. Alternatively, the video processing method is implemented in a circuit integrated to the entropy coding module in the video encoder or video decoder. FIG. 4 illustrates an exemplary system block diagram for a Video Encoder 400 implementing various embodiments of the video processing method. A Block Structure Partitioning module 410 receives input data of video pictures and determines a block partitioning structure for each video picture to be encoded. Each leaf coding block in the current video picture is predicted by Intra prediction in an Intra Prediction module 412 or Inter prediction in an Inter Prediction module 414 to remove spatial redundancy or temporal redundancy. The Intra Prediction module 412 provides intra predictors for the leaf coding block based on reconstructed video data of the current video picture. The Inter Prediction module 414 performs Motion Estimation (ME) and Motion Compensation (MC) to provide predictors for the leaf coding block based on video data from other video picture or pictures. A Switch 416 selects either the intra Prediction module 412 or Inter Prediction module 414 to supply the predictor to an Adder 418 to form prediction errors, also called residual data. The residual data in the current video picture is divided into multiple transform blocks. The residual data of each transform block is further processed by a Transform (T) module 420 followed by a Quantization (Q) module 422 to generate transform coefficient levels. In some embodiments of the present invention, the transform coefficient levels of each non-zero transform block are divided into multiple sub-blocks when the transform block is coded in TSM. The non-zero transform block contains at least one non-zero transform coefficient level. Each sub-block in a current transform block is entropy encoded by the Entropy Encoder 434 using multiple sub-block coding passes to generate a plurality of syntax elements representing the transform coefficient levels of the sub-block. Each transform coefficient level in a current sub-block is visited once according to a pre-defined scanning order in each sub-block coding pass. In one embodiment, a first sub-block coding pass encodes syntax elements sig_coeff_flag, abs_level_gt1_flag, par_level_flag, and abs_level_gt3_flag for transform coefficient levels in the current sub-block, and a second sub-block coding pass encodes syntax elements abs_level_gt5_flag, abs_level_gt7_flag, abs_level_gt9_flag for transform coefficient levels in the current sub-block. The Entropy Encoder 434 also encodes prediction information and filter information to form a video bitstream. The video bitstream is then packed with side information. The transform coefficient levels of the current transform block are processed by an Inverse Quantization (IQ) module 424 and an Inverse Transform (IT) module 426 to recover the residual data of the current transform block. As shown in FIG. 4, reconstructed video data are recovered by adding back the residual data to the selected predictor at a Reconstruction (REC) module 428. The reconstructed video data may be stored in a Reference Picture Buffer (Ref. Pict. Buffer) 432 and used by an Inter Prediction module 414 for prediction of other pictures. The reconstructed video data from the Reconstruction module 428 may be subject to various impairments due to the encoding processing, consequently, an In-loop Processing Filter 430 is applied to the reconstructed video data before storing in the Reference Picture Buffer 432 to further enhance picture quality.

Figure 5:
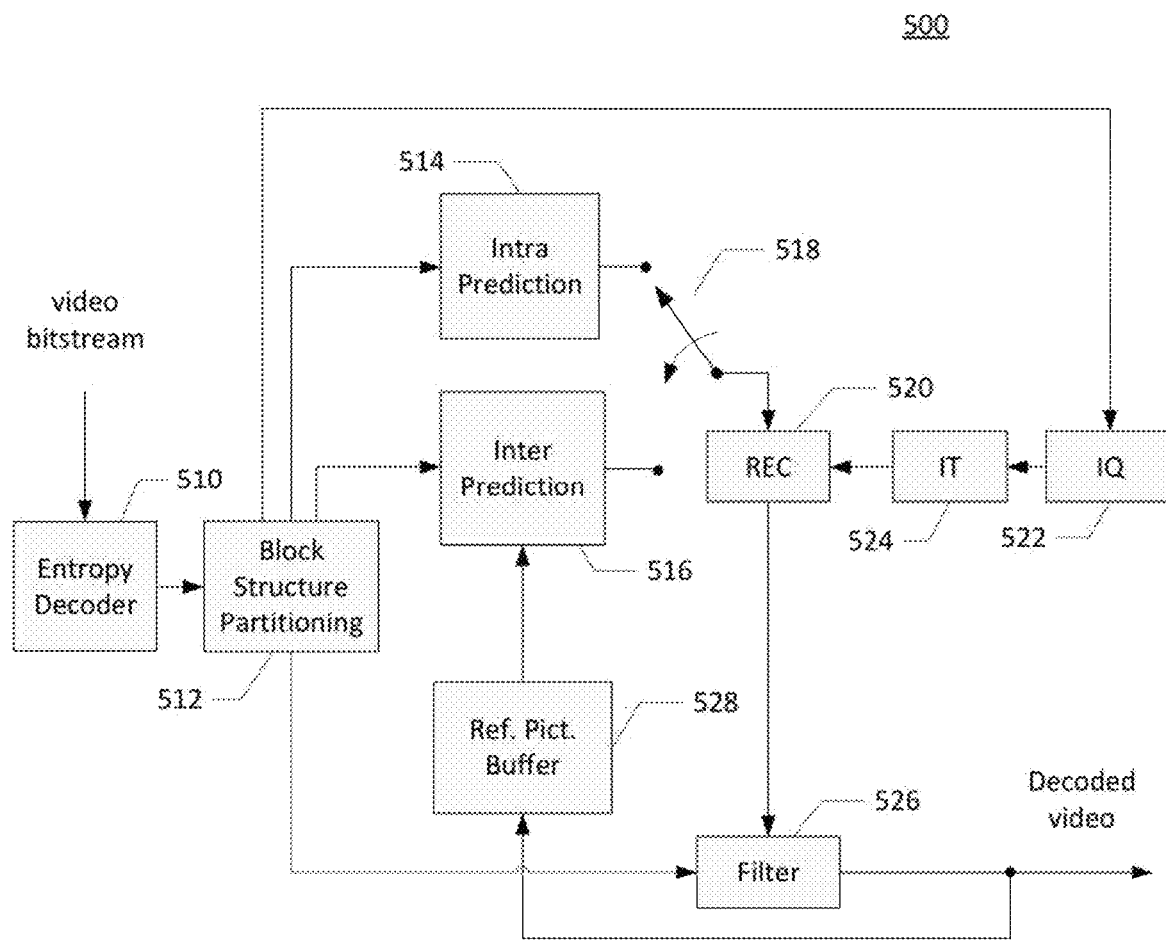
FIG. 5 illustrates an exemplary system block diagram for a video decoding system incorporating the video processing method according to embodiments of the present invention.

A corresponding Video Decoder 500 for decoding the video bitstream generated by the Video Encoder 400 of FIG. 4 is shown in FIG. 5. The input to the Video Decoder 500 is decoded by an Entropy Decoder 510 to parse and recover transform coefficient levels of each transform block and other system information. In some embodiments, the Entropy Decoder 510 first determines if a current transform block has at least one non-zero transform coefficient level according to a syntax element, and skips decoding the current transform block if the syntax element indicates all the transform coefficient levels in the current transform block are equal to 0. If there is at least one non-zero transform coefficient level, the current transform block is divided into a plurality of sub-blocks if it is coded in TSM, and transform coefficient levels in each sub-block are entropy decoded by the Entropy Decoder 510 using multiple sub-block coding passes. In one embodiment, a first sub-block coding pass for each sub-block decodes syntax elements sig_coeff_flag, abs_level_gt1_flag, and par_level_flag for transform coefficient levels in the sub-block, a second sub-block coding pass for each sub-block decodes syntax elements abs_level_gt3_flag, abs_level_gt5_flag, abs_level_gt7_flag, abs_level_gt9_flag for transform coefficient levels in the sub-block, and a third sub-block coding pass for each sub-block decodes syntax elements abs_remainder and coeff_sign_flag for transform coefficient levels in the sub-block. In another embodiments, all syntax elements coded in the CABAC mode are decoded in the first sub-block coding pass and syntax elements coded in the bypass mode are decoded in one or more following sub-block coding passes. After decoding all syntax elements for all sub-blocks, the transform coefficient levels of the current transform block are derived. A Block Structure Partitioning module 512 determines a block partitioning structure of each block in each video picture. The decoding process of the Decoder 500 is similar to the reconstruction loop at the Encoder 400, except the Decoder 500 only requires motion compensation prediction in Inter Prediction module 516. Each leaf block in the video picture is decoded by either an Intra Prediction module 514 or an Inter Prediction module 516, and a Switch 518 selects an Intra predictor or Inter predictor according to decoded mode information. The transform coefficient levels associated with each transform block is then recovered by an Inverse Quantization (IQ) module 522 and an Inverse Transform (IT) module 524. The recovered residual signal is reconstructed by adding back the predictor in a Reconstruction (REC) module 520 to produce reconstructed video. The reconstructed video is further processed by an In-loop Processing Filter (Filter) 526 to generate final decoded video. If a currently decoded video picture is a reference picture, the reconstructed video of the currently decoded video picture is also stored in a Reference Picture Buffer 528 for later pictures in decoding order.

Various components of the Video Encoder 400 and Video Decoder 500 in FIG. 4 and FIG. 5 may be implemented by hardware components, one or more processors configured to execute program instructions stored in a memory, or a combination of hardware and processor. For example, a processor executes program instructions to control receiving of input data associated with a transform block in a current video picture. The processor is equipped with a single or multiple processing cores. In some examples, the processor executes program instructions to perform functions in some components in the Encoder 400 and Decoder 500, and the memory electrically coupled with the processor is used to store the program instructions, information corresponding to the reconstructed data, and/or intermediate data during the encoding or decoding process. The memory in some embodiments includes a non-transitory computer readable medium, such as a semiconductor or solid-state memory, a Random Access Memory (RAM), a Read-Only Memory (ROM), a hard disk, an optical disk, or other suitable storage medium. The memory may also be a combination of two or more of the non-transitory computer readable mediums listed above. As shown in FIGS. 4 and 5, the Encoder 400 and Decoder 500 may be implemented in the same electronic device, so various functional components of the Encoder 400 and Decoder 500 may be shared or reused if implemented in the same electronic device. Any of the embodiments of the present invention may be implemented in a Block Structure Partitioning Module 410 of the Encoder 400, and/or a Block Structure Partitioning Module 512 of the Decoder 500. Alternatively, any of the embodiments may be implemented as a circuit coupled to the Block Structure Partitioning Module 410 of the Encoder 400 and/or the Block Structure Partitioning Module 512 of the Decoder 500, so as to provide the information needed by the entropy decoder 510 or the Block Structure Partitioning Module 512.

Embodiments of the video processing methods with one or more partition constraints may be implemented in a circuit integrated into a video compression chip or program code integrated into video compression software to perform the processing described above. For examples, determining of a block partitioning structure for the current block may be realized in program codes to be executed on a computer processor, a Digital Signal Processor (DSP), a microprocessor, or Field Programmable Gate Array (FPGA). These processors can be configured to perform particular tasks according to the invention, by executing machine-readable software code or firmware code that defines the particular methods embodied by the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

What is claimed is:

1. A method of processing video data in a video coding system, comprising:

receiving input data associated with a current transform block in a current picture;

dividing the current transform block into a plurality of sub-blocks; and entropy encoding or decoding each sub-block in the current transform block using multiple sub-block coding passes, wherein the current transform block is coded in a Transform Skip Mode (TSM), each absolute value of transform coefficient levels in each sub-block in the current transform block is represented according to an expression of $sig\_coeff\_flag + par\_level\_flag + abs\_level\_gt1\_flag + 2*abs\_level\_gt3\_flag + 2*abs\_level\_gt5\_flag + 2*abs\_level\_gt7\_flag + 2*abs\_level\_gt9\_flag + 2*abs\_remainder,$ sig_coeff_flag, abs_level_gt1_flag, abs_level_gt3_flag, abs_level_gt5_flag, abs_level_gt7_flag, and abs_level_gt9_flag for a particular transform coefficient level indicating whether a corresponding absolute value of the particular transform coefficient level is greater than 0, 1, 3, 5, 7, and 9, respectively, par_level_flag for the particular transform coefficient level indicating a parity of the particular transform coefficient level, and abs_remainder for the particular transform coefficient level indicating a remaining coefficient level value, syntax elements corresponding to sig_coeff_flag, coeff_sign_flag, abs_level_gt1_flag, and par_level_flag for the transform coefficient levels in each sub-block are encoded or decoded according to a Context-based Adaptive Binary Arithmetic Coding (CABAC) regular mode in a first sub-block coding pass, first other syntax elements corresponding to abs_level_gt3_flag, abs_level_gt5_flag, abs_level_gt7_flag, and abs_level_gt9_flag for the transform coefficient levels in each sub-block are encoded or decoded according to the CABAC regular mode in a second sub-block coding pass, second other syntax element corresponding to abs_remainder for the transform coefficient levels in each sub-block is encoded or decoded in a third sub-block coding pass, coeff_sign_flag for the particular transform coefficient level indicates a sign of the particular transform coefficient level, and a maximum allowed number of CABAC regular bins for the current transform block is determined according to the current transform block size, the maximum allowed number of CABAC regular bins for the current transform block being used for encoding or decoding syntax elements that include:

$$sig\_coeff\_flag, coeff\_sign\_flag, abs\_level\_gt1\_flag,\\ par\_level\_flag, abs\_level\_gt3\_flag,\\ abs\_level\_gt5\_flag, abs\_level\_gt7\_flag, \text{and}\\ abs\_level\_gt9\_flag.$$

2. The method of claim 1, further comprising determining if the current transform block has at least one non-zero transform coefficient level, and proceeding the steps of dividing the current transform block and entropy encoding or decoding each sub-block in the current transform block only if the current transform block has at least one non-zero transform coefficient level.

3. The method of claim 2, further comprising skip encoding or decoding all transform coefficient levels in the current transform block if the current transform block does not have any non-zero transform coefficient level.

4. The method of claim 2, wherein the step of determining if the current transform block has at least one non-zero transform coefficient level comprises parsing a Coded Block Flag (CBF) for the current transform block from a video bitstream containing the current picture.

5. The method of claim 1, wherein a transform block level flag is signaled or parsed to indicate the current transform block is to be encoded or decoded in the TSM.

6. The method of claim 1, further comprising determining if each sub-block in the current transform block is to be decoded according to a syntax element coded_sub_block_flag signaled for each sub-block, wherein the syntax element coded_sub_block_flag indicates whether a current sub-block contains any non-zero coefficient, and the current sub-block is not further decoded as all coefficients in the current sub-block are inferred to be 0 if the syntax element coded_sub_block_flag indicates the current sub-block not containing any non-zero coefficient.

7. The method of claim 1, wherein each transform coefficient level in each sub-block in the current transform block is visited once according to a pre-defined scanning order in each sub-block coding pass, and the pre-defined scanning order is a forward scanning order.

8. The method of claim 1, wherein one or more syntax elements for transform coefficient levels in a current sub-block are moved to a later sub-block coding pass if a number of context-coded bins is under a specified constraint in the current sub-block.

9. The method of claim 1, wherein dependent quantization is disabled for the current transform block in response to the current transform block being coded in the TSM.

10. An apparatus of processing video data in a video coding system, the apparatus comprising one or more electronic circuits configured to:

receive input data associated with a current transform block in a current picture;

divide the current transform block into a plurality of sub-blocks; and entropy encode or decode each sub-block in the current transform block using multiple sub-block coding passes, wherein the current transform block is coded in a Transform Skip Mode (TSM), each absolute value of transform coefficient levels in each sub-block in the current transform block is represented according to an expression of $$sig\_coeff\_flag + par\_level\_flag + abs\_level\_gt1\_flag +\\ 2*abs\_level\_gt3\_flag + 2*abs\_level\_gt5\_flag +\\ 2*abs\_level\_gt7\_flag + 2*abs\_level\_gt9\_flag + 2\\ abs\_remainder,$$

sig_coeff_flag, abs_level_gt1_flag, abs_level_gt3_flag, abs_level_gt5_flag, abs_level_gt7 flag, and abs_level_gt9_flag for a particular transform coefficient level indicating whether a corresponding absolute value of the particular transform coefficient level is greater than 0, 1, 3, 5, 7, and 9, respectively, par_level_flag for the particular transform coefficient level indicating a parity of the particular transform coefficient level, and abs_remainder for the particular transform coefficient level indicating a remaining coefficient level value, syntax elements corresponding to sig_coeff_flag, coeff_sign_flag, abs_level_gt1_flag, and par_level_flag for the transform coefficient levels in each sub-block are encoded or decoded according to a Context-based Adaptive Binary Arithmetic Coding (CABAC) regular mode in a first sub-block coding pass, first other syntax elements corresponding to abs_level_gt3_flag, abs_level_gt5_flag, abs_level_gt7_flag, and abs_level_gt9 flag for the transform coefficient levels in each sub-block are encoded or decoded according to the CABAC regular mode in a second sub-block coding pass, second other syntax element corresponding to abs_remainder for the transform coefficient levels in each sub-block is encoded or decoded in a third sub-block coding pass, coeff_sign_flag for the particular transform coefficient level indicates a sign of the particular transform coefficient level, and a maximum allowed number of CABAC regular bins for the current transform block is determined according to the current transform block size, the maximum allowed number of CABAC regular bins for the current transform block being used for encoding or decoding syntax elements that include:

sig_coeff_flag, coeff_sign_flag, abs_level_$gt$1_flag, $par$_level_flag, abs_level_$gt$3_flag, abs_level_$gt$5_flag, abs_level_$gt$7_flag, and abs_level_$gt$9_flag.

11. The apparatus of claim 10, wherein dependent quantization is disabled for the current transform block in response to the current transform block being coded in the TSM.

12. The apparatus of claim 10, wherein each transform coefficient level in each sub-block in the current transform block is visited once according to a pre-defined scanning order in each sub-block coding pass, and the pre-defined scanning order is a forward scanning order.

13. A non-transitory computer-readable medium storing a bitstream associated with video data, the bitstream comprising:

sub-block data associated with a plurality of sub-blocks divided from a current transform block coded in a Transform Skip Mode (TSM), wherein each absolute value of transform coefficient levels in each sub-block in the current transform block is represented according to an expression of sig_coeff_flag+$par$_level_flag+abs_level_$gt$1_flag+ 2*abs_level_$gt$3_flag+2 abs_level_$gt$5_flag+ 2*abs_level_$gt$7_flag+2*abs_level_$gt$9_flag+ 2*abs_remainder, sig_coeff_flag, abs_level_gt1_flag, abs_level_gt3_flag, abs_level_gt5_flag, abs_level_gt7 flag, and abs_level_gt9_flag for a particular transform coefficient level indicating whether a corresponding absolute value of the particular transform coefficient level is greater than 0, 1, 3, 5, 7, and 9, respectively, par_level_flag for the particular transform coefficient level indicating a parity of the particular transform coefficient level, and abs_remainder for the particular transform coefficient level indicating a remaining coefficient level value, syntax elements corresponding to sig_coeff_flag, coeff_sign_flag, abs_level_gt1_flag, and par_level_flag for the transform coefficient levels in each sub-block are decoded according to a Context-based Adaptive Binary Arithmetic Coding (CABAC) regular mode in a first sub-block coding pass, first other syntax elements corresponding to abs_level_gt3_flag, abs_level_gt5_flag, abs_level_gt7_flag, and abs_level_gt9 flag for the transform coefficient levels in each sub-block are decoded according to the CABAC regular mode in a second sub-block coding pass, second other syntax element corresponding to abs_remainder for the transform coefficient levels in each sub-block is decoded in a third sub-block coding pass, coeff_sign_flag for the particular transform coefficient level indicates a sign of the particular transform coefficient level, and a maximum allowed number of CABAC regular bins for the current transform block is determined according to the current transform block size, the maximum allowed number of CABAC regular bins for the current transform block being used for decoding syntax elements that include:

sig_coeff_flag, coeff_sign_flag, abs_level_$gt$1_flag, $par$_level_flag, abs_level_$gt$3_flag, abs_level_$gt$5_flag, abs_level_$gt$7_flag, and abs_level_$gt$9_flag.

14. The non-transitory computer-readable medium of claim 13, wherein dependent quantization is disabled for the current transform block in response to the current transform block being coded in the TSM.

15. The non-transitory computer-readable medium of claim 13, wherein each transform coefficient level in each sub-block in the current transform block is visited once according to a pre-defined scanning order in each sub-block coding pass, and the pre-defined scanning order is a forward scanning order.

* * * * *